Figure 1:
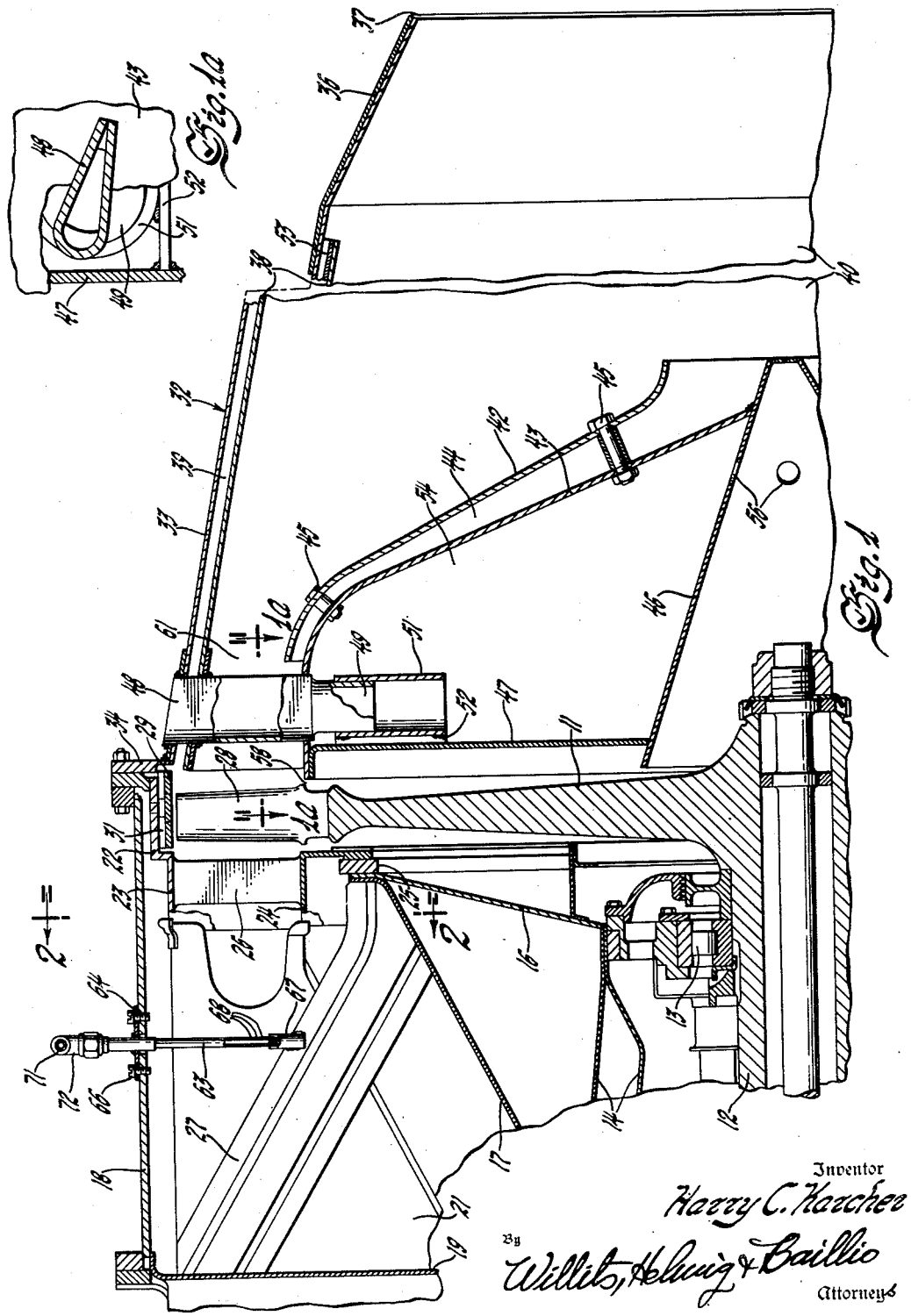

Jan. 1, 1957     H. C. KARCHER     2,775,864
JET PROPULSION ENGINE WITH AFTERBURNER
Filed April 10, 1951     2 Sheets-Sheet 1

Inventor
Harry C. Karcher
By Willits, Helmig & Baillio
Attorneys

United States Patent Office 2,775,864
Patented Jan. 1, 1957

2,775,864

JET PROPULSION ENGINE WITH AFTERBURNER

Harry C. Karcher, Indianapolis, Ind., assignor to General Motors Corporation, Detroit, Mich., a corporation of Delaware Application April 10, 1951, Serial No. 220,241

9 Claims. (Cl. 60—35.6)

This invention relates to jet propulsion engines, and more particularly to gas turbine jet engines including means for augmenting the thrust of the engine by combustion of fuel in the propulsive jet stream downstream from the turbine. An important feature of the invention lies in the introduction of fuel upstream of the turbine so that the fuel burned for thrust augmentation acts to cool the nozzle blades and turbine buckets. A further feature of the invention is that it eliminates the need for variable area exhaust nozzles such as are required for efficient operation with afterburners of previously known types.

By way of introduction to the subsequent description of the invention, it may be noted that it has been recognized for some time that the total thrust of a turbojet engine may be increased by burning fuel in the combustion gases downstream from the turbine. The turbine exhaust gases are capable of supporting combustion because of the large air-to-fuel ratio of the combustion apparatus of such engines. The afterburner may increase the thrust of the engine by thirty-five to fifty percent, thus greatly improving the performance of an aircraft under emergency conditions. This improvement is obtained at the expense of fuel economy; therefore, afterburners are not intended for continuous use.

In the usual turbojet engine with afterburner, a two-position variable area exhaust nozzle is required in order to adapt the engine for operation both under normal conditions (without afterburning) and under emergency conditions (with afterburning). With the size of the nozzle properly adapted for normal operation combustion in the afterburner would increase the back pressure and thereby temperature at the turbine to a destructive level; therefore, the jet nozzle must be enlarged as soon as afterburning is initiated. The two-position nozzle adds greatly to the weight and complexity of the afterburner mechanism.

In addition, prior art afterburners have required special apparatus, generally known as "flame holders" in order to maintain efficient combustion in the exhaust pipe of the engine and prevent the flame from being blown out. These flame holder structures likewise increase the complexity of the afterburner, and frequently give trouble, since they are exposed to the hot combustion gases.

This invention involves two principal features which eliminate these deficiencies of the known type of afterburner. These may be outlined brifly as follows:

The fuel is supplied ahead of the turbine and in practice is preferably added to the combustion chamber jacket air so that the fuel cools the turbine. Thus, when fuel is injected for afterburning, the cooling effect of the fuel compensates for the increased back pressure so that it is unnecessary to enlarge the exhaust nozzle. This feature eliminates the need for a variable exhaust nozzle. In practice, it may be desirable to inject a mixture of fuel and a coolant, such as water, to obtain additional cooling effect beyond that which may be obtained by fuel injection alone.

The second major aspect of the invention, which makes possible the elimination of the flame holder structures, lies in the construction of the exhaust duct immediately downstream of the turbine so that its cross section enlarges rapidly, the resulting turbulence serving to provide a zone suitable for the maintenance of combustion. A subsidiary feature of this aspect of the invention lies in provision for cooling the walls which bound the afterburner combustion space. Such cooling cannot readily be accomplished with flame holder grids which are mounted within the exhaust gas stream.

The nature and advantages of the invention and the preferred manner in which the principles of the invention are embodied in a gas turbine jet engine will be clear to those skilled in the art from the succeeding detailed description of the preferred structural embodiment of the invention.

The principal objects of the invention are to improve the performance of jet propulsion engines; to provide an improved means for thrust augmentation of gas turbine jet engines; to provide afterburning in a turbojet engine without the employment of variable area exhaust nozzles; to provide an afterburner which operates efficiently without the necessity for flame holders or equivalent structures mounted in the exhaust stream; to utilize the fuel injected for afterburning to cool the turbine; and to provide cooling for the afterburner structure.

Figure 2:
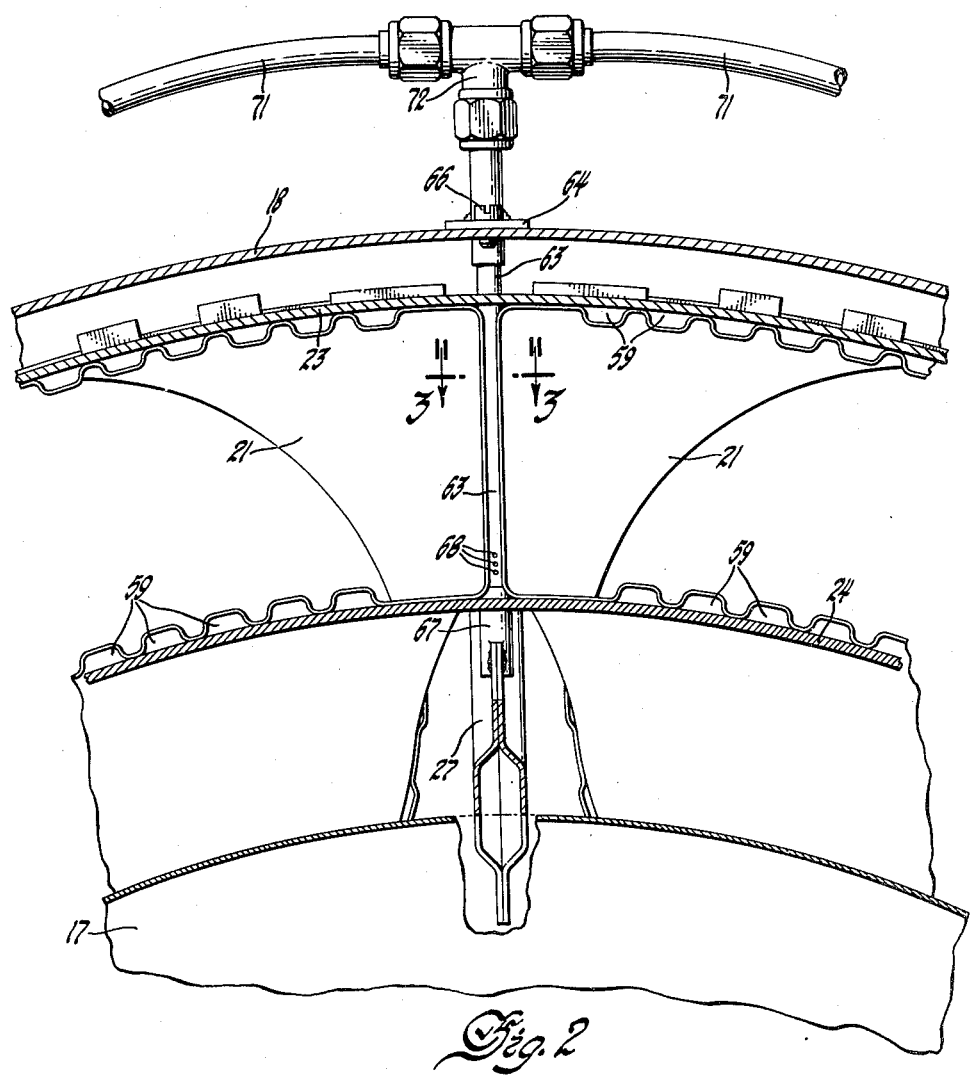
Figure 3:
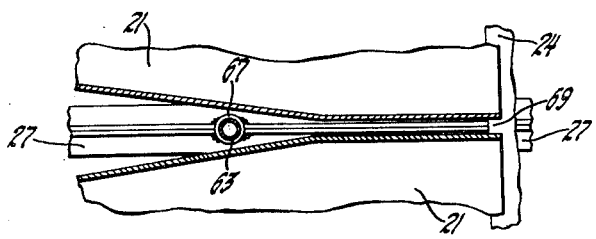

Referring to the drawings illustrative of the preferred embodiment of the invention; Figure 1 is a longitudinal sectional view of the after portion of a gas turbine engine incorporating the invention; Figure 1a is a detail sectional view taken on the plane indicated in Figure 1; Figure 2 is a partial transverse section of the engine taken on the plane indicated in Figure 1; and Figure 3 is a detail sectional view taken on the plane indicated in Figure 2.

Figure 1 illustrates only the after portion of a gas turbine engine, since the details of the portion of the engine not shown are immaterial to the invention and need not be described for an understanding thereof. Gas turbine jet engines ordinarily comprise an air compressor, a combustion apparatus supplied by the compressor, a turbine energized by the gases issuing from the combustion apparatus and coupled to the compressor to drive the same, and a turbine exhaust passage or jet pipe terminating in a nozzle from which the exhaust gases issue at high speed to provide propulsive thrust. When afterburning is to be employed, the structure of the tail pipe is modified to provide for the introduction of fuel and combustion thereof between the turbine and jet nozzle. Since the general structure of gas turbines is well understood by those skilled in the art, I have omitted from Figure 1 the compressor, the major portion of the combustion apparatus, the shafting by which the compressor is coupled to the turbine, and various auxiliary apparatus.

The invention is illustrated in Figure 1 as an addition to or modification of a well-known contemporary engine widely used for aircraft propulsion. The engine includes a turbine wheel 11 on a shaft 12 supported in a roller bearing 13 adjacent the turbine and in an additional bearing (not shown). The bearing 13 is mounted in a tubular structure 14 which is a part of the frame of the engine. An annular plate 16 and a cone 17 fixed to the tubular member 14 likewise constitute parts of the frame. The rear portion of the combustion apparatus lies within a generally annular chamber bounded by the cone 17, an outer cylindrical shell 18 and a forward plate 19 which is provided with apertures to receive the rearward or discharge ends of individual combustion chambers disposed in an annular array around the shaft 12 and frame member 14. The combustion chambers (not shown) are of conventional type comprising an outer cylinder and a perforated inner cylinder or flame tube within which the combustion of the primary fuel is accomplished. Each flame tube is connected at its discharge end to a transition tube 21 which constitutes a hot gas duct to conduct the combustion gases from the flame tube to the turbine nozzle. The transition tube or duct changes in section from circular at the front end to a sector of an annulus at the rear or turbine nozzle end, the rear ends of the transition tubes being disposed closely adjacent to each other at the turbine nozzle (Figs. 2 and 3). The turbine nozzle structure comprises a flanged outer ring 22, the rearward part of which forms a part of the casing surrounding the turbine wheel and the forward portion 23 of which constitutes the outer ring or shroud of the turbine nozzle. The inner turbine nozzle ring 24 is provided with an inwardly directed flange which is bolted or otherwise fixed to a stiffening ring 25 at the periphery of the frame portions 16 and 17. Nozzle blades 26 extend between the rings 23 and 24. Struts 27 extend from the cone 17 and stiffener ring 25 to the plate 19 to stiffen the plate 19 and shroud 18.

The turbine wheel 11 mounts blades 28 which rotate within a shroud 29 preferably composed of a number of sections secured to the casing 22 and spaced from the casing through most of the circumference to provide cooling air passages 31. The turbine discharges into a tail pipe generally indicated at 32. The tail pipe structure comprises a slightly converging outer wall 33 welded to a bolting flange 34 by which it is secured to the turbine casing 22 and after combustion section casing 18. The rearward end of the tail comprises a section 36 which converges more sharply to an exhaust or jet opening 37. The portion 33 of the tail pipe is provided with an inner wall or shroud 38 spaced from the outer wall 33 to define an annular passage 39 for circulation of cooling air between the walls 33 and 38.

Afterburning combustion is effected in the chamber 40 enclosed by the portion 33 of the tail pipe with the generation of a great amount of heat, so that the circulation of relatively cool gas between the outer walls is highly beneficial in preserving the structure and in reducing the skin temperature of the outer casing. The forward wall of the afterburning combustion space 40 is defined by a shallow cone 42 curved at the edges to prevent too abrupt change of direction flow of the turbine exhaust gases. The cone 42 is supported on and spaced from an inner cone 43 which extends from the inner end of the turbine buckets by conventional supports 45. A cooling air passage 44 is thus defined between the cones 42 and 43. The cone 43 is fixed to a conical inner support member 46 and an annular disk or diaphragm 47, these being welded together to form a strong light-weight structure.

The entire tailcone assembly is supported from the outer shell 33 by a number of streamlined struts 48 welded to the outer shell 33 and extending through the turbine exhaust passage. The inner end portions 49 of the struts 48 are preferably circular in section and are piloted in sleeves 51 welded to brackets 52 extending from the annular plate 47. It will be noted that this arrangement provides for radial expansion of the inner cone due to heat but otherwise locates it positively. The struts 48 are preferably set with their chords skewed to provide a zero angle of attack with respect to the gases issuing from the turbine to insure minimum disturbance of the turbine exhaust. It will be noted that the struts 48 are welded to the inner shroud 38 so as to provide support for this shroud. Additional supporting members of any suitable type may be provided at the forward edge of the shrouds 33 and 38 between the struts 48. The rear ends of the shrouds 33 and 38 are maintained in proper spaced relation by a spacing ring or spacing members 53 which may be constituted by a corrugated ring or spacing fingers welded to the inner shroud and bearing against the outer shroud. In this manner, provision is made for relative longitudinal expansion of the shrouds.

Any one or more of the struts 48 may be hollow and may be supplied with appropriate fittings for introduction of air under pressure into the interior of the exhaust cone, which compressed air may be obtained in known manner from the compressor discharge or an intermediate stage of the compressor. The air enters the chamber 54 and passes through openings 56 in the cone 46 thus cooling to some extent the cone 43. The cooling air then flows forward and outward over the rear face of the turbine wheel, entering the turbine exhaust duct through the annular gap 58 between the turbine wheel and the forward edge of the tailcone 43. The cooling air is then carried rearwardly by the gas stream and flows through the passage 44 between the shroud 42 and the cone 43.

A certain part of the gases exhausted from the turbine also flow through the passage 44. Although there gases are by no means cool, the gases adjacent the inner and outer boundaries of the exhaust passage are cooler than those in the central part of the exhaust passage, since the gases passing near the tips and roots of the turbine blades 28 are more strongly diluted with combustion chamber jacket air, which reduces the temperature. As shown most clearly in Figure 2, the rear ends of the combustion chamber liner transition sections 21 lie between the turbine nozzle shrouds 23 and 24. The inner and outer margins of the rear ends of these transition sections are corrugated or scalloped to provide cooling air inlets 59 through which cooling air is admitted to flow across the shroud rings 23 and 24 and through the turbine. This relatively highly diluted and thus relatively cool gas thus forms strata following the outer boundaries of the path through the turbine so that the cooler air is directed into the annular cooling passages 39 and 44. Some of this cooler air flowing across the outer turbine nozzle shroud 23 passes through the spaces 31 between the turbine casing and shroud and into the passage 39. Air supplied to the forward face of the turbine wheel 11 (by means not shown) flows across the roots of the turbine blades and into the passage 44.

The major portion of the exhaust from the turbine, including the hotter portion of the gas, passes through the annular opening 61 between the shrouds 38 and 42 and into the chamber 40 which, as will be seen, enlarges rapidly in a downstream direction. As will be apparent, this passage diverges much more abruptly than conventional turbojet exhaust passages in which it is desired to obtain gradual diffusion of the turbine exhaust gases with a minimum of turbulence. The relatively abrupt expansion of the cross section of the exhaust passage is adapted to generate a suitable amount of turbulence to promote combustion within the chamber 40 just downstream of the cone 42. For this purpose, it appears desirable for the included angle of the cone 42 to be about 125°, although the angle does not appear to be critical.

Fuel for afterburning is introduced by a number of nozzles 63 (Figs. 1, 2, and 3), one nozzle being located in the space between each pair of adjoining combustion chamber transition sections 21. The structure of the nozzles may vary, but in the preferred structure, each nozzle comprises a tube closed at the lower end and welded to a mounting plate 64 which may be fixed to the casing 18 in any suitable manner, as by screws 66. The inner end of the tube 63 is piloted in a supporting sleeve 67 welded to the strut 27. Small orifice 68 are drilled in the tube to discharge fuel into the space between the radially extending walls of the transition sections 21. This fuel is carried rearwardly by the cooling air passing between the transition sections 21 and discharged through the gap 69 between the combustion chamber outlets. The fuel-laden jacket air thus flows through the diaphragm and the turbine wheel 28 and is carried with the turbine exhaust gases into the chamber 40, where mixing is completed and combustion takes place. Fuel may be fed to the nozzles 63 by any suitable piping arrangement, such as a ring manifold 71 coupled to each of the nozzles 63 by a T 72.

The fuel may be supplied from any suitable pump through a shutoff valve and such automatic controls as may be desired to provide the requisite amount of fuel for most satisfactory afterburning operation. The manner in which the fuel is supplied and the quantity is regulated are immaterial to the invention.

As will be apparent, the introduction of liquid fuel ahead of the turbine effects a substantial cooling of the turbine blades. This cooling compensates for the tendency for the temperature at the turbine to rise when afterburning is effected and thus makes it unnecessary to increase the area of the nozzle 37 to reduce the temperature at the turbine during operation of the afterburner. A coolant such as water may be mixed with the fuel for additional cooling of the turbine if desired.

The operation of the device may be outlined briefly, although it will presumably be clear to those skilled in the art from the foregoing. In normal operation, no fuel is supplied to the nozzles 63 and the turbine operates in the normal fashion, being supplied with operating medium through the transition sections 21 and with cooling air around the boundaries of the transition sections as well as cooling air supplied to the faces of the turbine wheel. The exhaust gases, which leave the turbine at high velocity, are diffused in the tail pipe which is of much greater area than the turbine exhaust. The abrupt tail cone introduces some flow losses which might be avoided by the use of a gradually tapered tail cone, but this disadvantage is relatively slight in view of the important advantages of the invention. To augment the thrust of the engine, it is necessary only to supply fuel to the nozzles 63, which fuel passes through the turbine without burning, as the velocity of the gas is much greater than the velocity of flame propagation. The fuel is vaporized by the hot gases and mixed therewith by the action of the turbine. As the velocity decreases and turbulence sets in due to the rapid expansion of the area of the tail pipe, the fuel is ignited by the hot gases and burns downstream of the cone 42, increasing the temperature and velocity of the gases exhausted through the nozzle 37. Since the nozzle is fixed, there is no need to provide a variable nozzle with the attendant actuating mechanism and controls, which greatly increase the weight and complexity of conventional afterburner installations.

The cooler air flowing along the inner and outer boundaries of the passage through the turbine continues through the annular cooling passages between the shrouds 33 and 38 and between the cones 42 and 43. The temperature of this air will be of the order of 1200° F. As the temperature in the combustion zone in the afterburner may reach 3000°, it will be seen that a great deal of cooling will be accomplished even with the cooling air at 1200°. An important advantage of this afterburner engine is that the walls of the combustion chamber 40 are cooled and there are no flame holders or the like mounted directly in the gas stream without provision for cooling.

To resume normal operation, it is necessary only to terminate the supply of fuel to the manifold 71.

It will be apparent to those skilled in the art that many modifications of the invention may be made within the principles thereof. It will also be apparent that many of the novel and advantageous features of the invention may be employed in other structures than the preferred embodiment described herein.

I claim:

1. A jet propulsion engine comprising, in combination, a turbine, means defining an inlet passage to the turbine for discharging motive fluid into the turbine, means for supplying relatively cool air from the passage to the turbine adjacent the boundaries of the passage, a turbine exhaust pipe terminating in a jet propulsion nozzle of fixed area, the exhaust pipe expanding abruptly in cross-section downstream from the turbine to define an afterburner combustion chamber and to create turbulence in the combustion chamber to hold combustion therein, the walls of the exhaust pipe being double and the inner walls being disposed to receive gases discharged adjacent the boundaries of the turbine passage for circulation between the walls to cool the walls, and means for introducing fuel into the combustion chamber.

2. A jet propulsion engine comprising, in combination, a turbine, means defining an inlet passage to the turbine including means defining a plurality of spaced hot gas ducts in the passage terminating adjacent the turbine for discharging motive fluid into the turbine and means for discharging relatively cool air through the spaces between the ducts into the turbine, means for introducing liquid fuel into the said air for discharge into the turbine, a turbine exhaust pipe terminating in a jet propulsion nozzle, and means in the exhaust pipe to define an afterburner combustion chamber and to create turbulence in the combustion chamber to hold combustion therein.

3. A jet propulsion engine comprising, in combination, a turbine, means defining an inlet passage to the turbine including means defining a plurality of spaced hot gas ducts in the passage terminating adjacent the turbine for discharging motive fluid into the turbine and means for discharging relatively cool air through the spaces between the ducts into the turbine, means for introducing liquid fuel into the said air for discharge into the turbine, and a turbine exhaust pipe terminating in a jet propulsion nozzle of fixed area, the exhaust pipe expanding abruptly in cross-section downstream from the turbine to define an afterburner combustion chamber and to create turbulence in the combustion chamber to hold combustion therein.

4. A jet propulsion engine comprising, in combination, a turbine, means defining an inlet passage to the turbine including means defining a plurality of spaced hot gas ducts in the passage terminating adjacent the turbine for discharging motive fluid into the turbine and means for discharging relatively cool air through the spaces between the ducts into the turbine, means for introducing liquid fuel into the said air for discharge into the turbine, and a turbine exhaust pipe terminating in a jet propulsion nozzle, the exhaust pipe expanding abruptly in cross-section downstream from the turbine to define an afterburner combustion chamber and to create turbulence in the combustion chamber to hold combustion therein, the exhaust pipe having an inner wall and an outer wall and the inner wall being disposed to receive gases discharged adjacent the boundaries of the turbine passage for circulation between the walls to cool the walls.

5. A jet propulsion engine comprising, in combination, a turbine, means defining an inlet passage to the turbine including means defining a plurality of spaced hot gas ducts in the passage terminating adjacent the turbine for discharging motive fluid into the turbine, means for supplying relatively cool air to the turbine adjacent the boundaries of the passage, and means for discharging relatively cool air through the spaces between the ducts into the turbine, means for introducing liquid fuel into the air discharged from between the ducts, and a turbine exhaust pipe terminating in a jet propulsion nozzle of fixed area, the exhaust pipe expanding abruptly in cross-section downstream from the turbine to define an afterburner combustion chamber and to create turbulence in the combustion chamber to hold combustion therein, the exhaust pipe having an inner wall and an outer wall and the inner wall being disposed to receive gases discharged adjacent the boundaries of the turbine passage for circulation between the walls to cool the walls.

6. A jet propulsion engine comprising, in combination, a turbine defining an annular flow path, means for supplying combustion products to the turbine for energization thereof, means for supplying unburned fuel to the turbine at will concurrently with the combustion products, a turbine exhaust pipe terminating in a jet propulsion nozzle and defining a combustion chamber between the turbine and the nozzle, and a tailcone supported in the exhaust pipe, the exhaust pipe and tailcone defining a conduit, the cross-sectional area of the said conduit increasing sharply and substantially from the turbine to the combustion chamber and the tailcone being obtuse so as to contribute to the enlargement of the cross-sectional area of the conduit and to generate turbulence in the combustion chamber, the tailcone having two walls defining a double outer wall with an annular passage between the walls open at the ends, the entrance of the said annular passage being disposed so as to receive gases discharged from the turbine adjacent the boundary of the annular flow path through the turbine for circulation between the walls for cooling thereof.

7. A jet propulsion engine comprising, in combination, a turbine defining an annular flow path, means for supplying combustion products to the turbine for energization thereof, means for supplying unburned fuel to the turbine at will concurrently with the combustion products, a turbine exhaust pipe terminating in a jet propulsion nozzle and defining a combustion chamber between the turbine and the nozzle, and a tailcone supported in the exhaust pipe, the exhaust pipe and tailcone defining a conduit, the cross-sectional area of the said conduit increasing sharply and substantially from the turbine to the combustion chamber and the tailcone being obtuse so as to contribute to the enlargement of the cross-sectional area of the conduit and to generate turbulence in the combustion chamber, the exhaust pipe having two walls defining a double outer wall with an annular passage between the walls open at the ends, the entrance of the said annular passage being disposed so as to receive gases discharged from the turbine adjacent the boundary of the annular flow path through the turbine for circulation between the walls for cooling thereof.

8. A jet propulsion engine comprising, in combination, a duct, an obtuse cone mounted in the forward end thereof with the apex of the cone directed rearwardly and defining an annular entrance to the passage through the duct, a combustion space in the duct rearwardly of the cone, the cross-sectional area of the passage increasing sharply and substantially between the entrance thereto and the combustion space, a jet propulsion exhaust outlet at the rearward end of the duct, means for supplying combustion-supporting gas under pressure to the entrance of the duct, and means for supplying fuel to the duct; the duct and cone being formed with double walls adapted for circulation of cooling fluid between the walls and open at the forward end to receive fluid from the said entrance.

9. A jet propulsion engine comprising, in combination, a duct, an obtuse cone mounted in the forward end thereof with the apex of the cone directed rearwardly and defining an annular entrance to the passage through the duct, a combustion space in the duct rearwardly of the cone, the cross-sectional area of the passage increasing sharply and substantially between the entrance thereto and the combustion space, a turbine at the entrance to the duct, a jet propulsion exhaust outlet at the rearward end of the duct, and means for supplying combustion-supporting gas under pressure and fuel to the entrance of the duct through the turbine; the duct and cone being formed with double walls adapted for circulation of cooling fluid between the walls and open at the forward end to receive fluid from the said entrance adjacent the inner and outer margins thereof.

References Cited in the file of this patent

UNITED STATES PATENTS

| | | |
|---|---|---|
| 2,445,661 | Constant et al. | July 20, 1948 |
| 2,464,724 | Sédille | Mar. 15, 1949 |
| 2,479,573 | Howard | Aug. 23, 1949 |
| 2,508,420 | Redding | May 23, 1950 |
| 2,520,967 | Schmitt | Sept. 5, 1950 |
| 2,579,114 | Halford et al. | Dec. 16, 1951 |
| 2,636,344 | Heath | Apr. 28, 1953 |
| 2,637,972 | Laucher | May 12, 1953 |

FOREIGN PATENTS

| | | |
|---|---|---|
| 346,599 | Germany | Jan. 5, 1922 |